United States Patent [19]

Stefansky

[11] Patent Number: 5,170,300
[45] Date of Patent: Dec. 8, 1992

[54] MAGNETIC PARKING DEVICE FOR DISK DRIVE

[75] Inventor: Frederick M. Stefansky, Longmont, Colo.

[73] Assignee: Conner Peripherals, Inc., San Jose, Calif.

[21] Appl. No.: 643,703

[22] Filed: Jan. 22, 1991

Related U.S. Application Data

[63] Continuation of Ser. No. 269,873, Nov. 10, 1988, abandoned.

[51] Int. Cl.$^5$ .............................................. G11B 5/54
[52] U.S. Cl. ................................... 360/105; 360/97.01
[58] Field of Search ............. 360/105, 106, 75, 97.01, 360/78.12, 78.01, 78.04

[56] References Cited

U.S. PATENT DOCUMENTS

| | | | |
|---|---|---|---|
| 4,635,151 | 1/1987 | Hazebrouck | 360/105 |
| 4,639,863 | 1/1987 | Harrison et al. | 360/97 X |
| 4,660,120 | 4/1987 | Manzke et al. | 360/105 X |
| 4,710,834 | 12/1987 | Brand et al. | 360/105 |
| 4,853,807 | 8/1989 | Trager | 360/97.01 |
| 4,890,176 | 12/1989 | Casey et al. | 360/105 |

OTHER PUBLICATIONS

IBM Technical Disclosure Bulletin, vol. 19, No. 4, Sep. 1976, Actuator Retraction Device, Hearn.

*Primary Examiner*—Andrew L. Sniezek
*Attorney, Agent, or Firm*—Fliesler, Dubb, Meyer & Lovejoy

[57] ABSTRACT

A magnetic parking device for a disk drive includes a magnet and a member for containing the magnetic field produced by the magnet. The magnetic field containing member has an air gap which is substantially parallel to the magnet flux lines of the magnetic field so that there is no fringing of the magnetic field outside of the gap. The device magnetically captures a magnetically permeable capture member provided on the actuator of a disk drive without contacting the capture member and only when the actuator enters the gap in the magnetic field containing member.

7 Claims, 6 Drawing Sheets

MAGNETIC PARKING DEVICE FOR DISK DRIVE

CONTINUING APPLICATION DATA

This application is a continuation of Ser. No. 07/269,873, filed Nov. 10, 1988, now abandoned.

CROSS-REFERENCE TO RELATED APPLICATIONS

LOW HEIGHT DISK DRIVE, Ser. No. 147,804, filed Jan. 25, 1988, inventor Frederick Mark Stefansky, assigned to the assignee of the present application; now U.S. Pat. No. 4,965,684.

DISK DRIVE ARCHITECTURE, Ser. No. 056,584, filed May 29, 1987, inventors Frederick Mark Stefansky and Glade N. Bagnell, assigned to the assignee of the present application; now U.S. Pat. No. 4,896,230.

DISK DRIVE SOFTWARE SYSTEM ARCHITECTURE, Ser. No. 057,806, filed Jun. 2, 1987, inventors John P. Squires, Thomas A. Fiers and Louis J. Shrinkle, assigned to the assignee of the present application; now abandoned.

DISK DRIVE SOFTWARE SYSTEM ARCHITECTURE UTILIZING IMBEDDED REAL TIME DIAGNOSTIC MONITOR, pending Ser. No. 058,289, filed Jun. 2, 1987, inventors John P. Squires, Thomas A. Fiers and Louis J. Shrinkle, assigned to the assignee of the present application.

BACKGROUND OF THE INVENTION

1. Field of the Invention

The present invention relates to parking devices for disk drives; more particularly, to devices which position and retain the head(s) of a disk drive over a selected portion of a hard (or fixed) disk when the disk drive is not in use.

2. Description of the Related Art

Developments in personal computers, portable computers and lap top computers have prompted reductions in the size and increases in the memory capacity of disk drives. Factors which hamper the incorporation and use of fixed or hard disks in lap-top computers include the size, weight, and power consumption of hard disk drives. The desire to operate portable computers on battery supplied power, and the reduction of the life of the batteries by each power consuming component of a computer, have prompted efforts to reduce the power consumed by disk drives intended for use in portable computers.

Conventional hard disk drives often incorporate a device for parking the head(s) of the drive. As used in this patent, the terms "park" and "parking" refer to the maintaining the position of the head(s) over a selected portion (usually a "landing zone" at the inside or outside diameter) of the disk (or disks). The heads are supported by an actuator, and parking the heads also means parking the actuator by fixing the position of the actuator which supports the heads.

In conventional disk drives, a head "flys" over the surface of a disk, riding on the stream of air created by the rotation of the disk. When the disk stops rotating, for example, when power is turned off, the head lands on the disk. If the head lands on a portion of the disk which is used to store data, there is a possibility that the disk, and thus the data stored on the disk, will be damaged. Parking the head(s) is particularly important in portable computers, in which the disk drive may be continually subject to large physical shocks during transportation. Non-operational physical shocks, for example, shocks experienced during transportation of portable computers or shipping may cause the heads to "slap" against the disk, possibly causing a loss of data if the head slaps against a data-carrying portion of the disk. Parking the head assures that the head will land on a landing zone—i.e., a non-data storage portion of the disk—and will be held in a position over the landing zone during the power-down period.

Various types of parking (or latching) devices have been used to look the actuator arm of a voice coil in a selected position when the disk drive is not operating. Many parking devices incorporate a latch which physically engages the actuator arm and utilizes a sping to bias a pivoting latch arm to a parked position and an electromagnet to release the latch during operation of the drive. The use of an electromagnet to release the latch requires the continual use of electrical power to maintain the latch in the unlatched position. Further, an electromagnet generates heat which is not desirable in a disk drive or any other area in a computer.

Air activated parking devices rely on the air flow generated by the rotating disks to release a spring biased latch arm. Air activated parking devices pose the problem of interference with the air flow necessary for the heads to fly properly. Further, the amount of force generated by the air flow is related to the surface area of the disks, and as disks are reduced in size, the amount of air flow may be insufficient to release a latch mechanism.

Solenoids have also been used to release latch arms which are spring biased. As with an electromagnet, a solenoid requires a constant supply of electrical current, and the residual magnetism of the plunger must be overcome by the biasing force.

Such parking devices often utilize pivoting latch arms which often present design, manufacturing, and operational problems related to, for example, balancing the latch arm to provide proper functioning of the latch for all orientations of the disk drive. A latch which does not operate properly for all orientations of the disk drive is not suitable for use in a portable or lap-top computer.

Reliability of electromagnetic parking devices which attract a permeable member requires overcoming any residual magnetism in the permeable member, prompting the use of larger bias springs. However, larger spring forces demand greater electrical power to energize an electromagnet which reliably overcomes the spring force.

Purely magnetic parking devices park the actuator by the attraction by a magnet of a magnetically permeable portion of the actuator. Such parking devices have provided direct contact between the magnetically permeable portion of the actuator and the magnet. The primary drawback of a magnetic latch of this type is that the rotational movement of the actuator is adversely affected by the attraction of the magnetically permeable portion of the actuator and the magnet, thereby creating problems with the track following and seek functions. Further, an extremely large force is required to release the actuator from the magnet.

Each component of a disk drive represents an increase in the weight of the drive, the space occupied by the drive, and the manufacturing effort. A large number of mechanical components, particularly the moving components of a latch mechanism, increases the possibility and probability of a mechanical failure of the drive. The number and complexity of mechanical components is also related to the ability of the drive to survive physical shocks and vibrations.

SUMMARY OF THE INVENTION

It is, therefore, an object of the present invention to provide a parking device for a disk drive which does not use any electrical power during operation of the disk drive.

A further object of the present invention is to provide a parking device which requires an minimum amount of space in the disk drive.

Another object of the present invention is to provide a parking device which magnetically captures (or parks) the actuator of a disk drive.

Another object of the present invention is to provide a parking device which parks the actuator without relying on physical latching of the parking device and the actuator.

Another object of the present invention is to provide a magnetic parking device which provides a "black hole" magnetic effect; the black hole effect concentrates a magnetic field in an interactive region where the magnetic field captures an actuator and substantially eliminates the leakage of the magnetic field outside of the interactive region.

Another object of the present invention is to provide a magnetic parking device including a magnetic unit which contains a magnetic field and which captures the actuator only when the actuator is located within a slot (air gap) in the magnetic unit.

Another object of the present invention is to provide a magnetic parking device which does not utilize any moving parts other than the actuator arm.

Another object of the present invention is to provide a magnetic parking device which is easy to assemble in a disk drive.

A magnetic parking device in accordance with the present invention, which is useful in, for example, a disk drive having a data storage medium, a transducer for reading information from and writing information to the data storage medium, and an actuator for selectively positioning the transducer with respect to the data storage medium, includes a magnetically permeable capture member provided on the actuator and magnetic parking means for capturing and magnetically retaining the capture member to park the transducer. The magnetic parking means includes a magnet and a magnetic field containing member having a slot (or air gap), and captures the capture member to park the head only when the capture member enters the air gap.

In a first embodiment of the magnetic means the air gap in the magnetic field containing member is substantially perpendicular to the direction of the magnetic field flux lines in the field containing member. The actuator of a disk drive is captured and retained by the magnetic field in and around the air gap.

In a second embodiment of the magnetic means the air gap in the magnetic field containing member is substantially parallel to the direction of the magnetic field flux paths in the field containing member. This orientation causes substantially all of the magnetic flux paths of the magnetic field to be contained in the magnetic unit and the air gap in the magnetic unit and prevents fringing (or magnetic leakage), providing the black hole effect. The black hole effect assures that the actuator is captured only when the actuator enters the gap in the magnetic field containing member, provides increased capture force, and improves retention of the actuator. In addition, the substantial elimination of magnetic leakage outside the air gap increases the portion of the surface of the disk which can be used for data storage. The actuator is released from the magnetic parking device by the same forces generated by the actuator to position the head(s) of the disk drive with respect to the disk(s).

DESCRIPTION OF THE PREFERRED EMBODIMENT

A disk drive including a magnetic parking device according to the present invention will be described with reference to FIGS. 1-7. The disk drive described herein includes, for example, a single hard disk with a magnetic coating and utilizes Winchester technology; however, the disk drive may utilize various numbers of disks (and a corresponding number of heads, usually one per disk surface—two (2) heads per disk) and other types of disks, for example, optical disks, and other read/write technologies, for example, lasers.

Figure 1A:
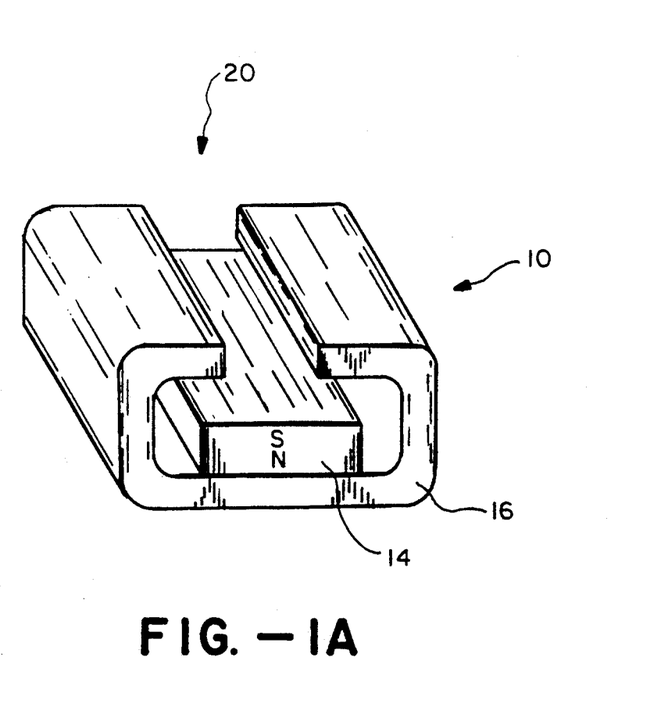
FIG. 1A is an isometric view of a first embodiment of a magnetic unit of a parking device in accordance with the present invention.
Figure 1B:
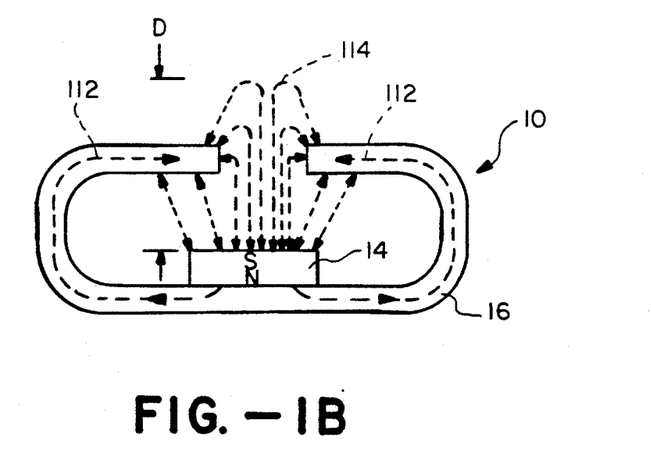
FIG. 1B is an end view of the magnetic unit shown in FIG. 1A.
Figure 2A:
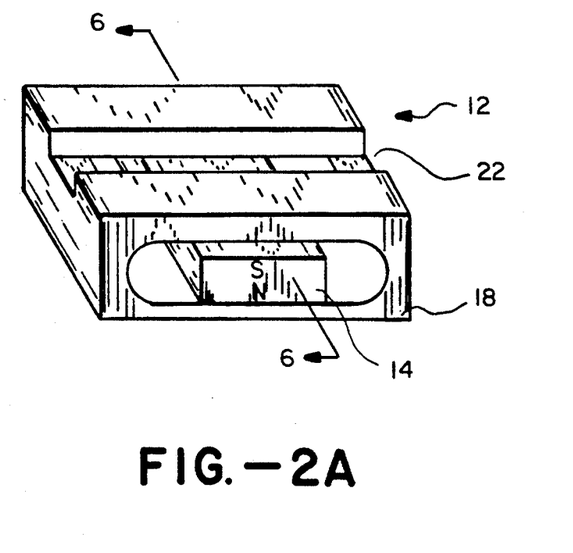
FIG. 2A is an isometric view of a second embodiment of a magnetic unit of a parking device in accordance with the present invention.
Figure 2B:
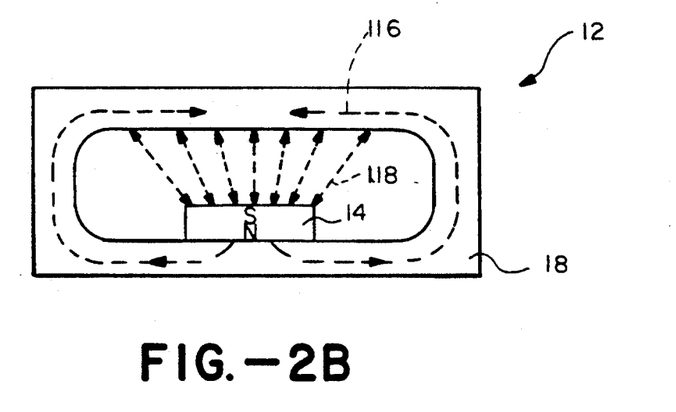
FIG. 2B is an end view of the magnetic unit shown in FIG. 2A.

The use of a magnetic field to park the heads in a disk drive, as opposed to a mechanical latch, eliminates the need for an electromagnetic or air activated device to release the mechanical latch during operation of the disk drive. Magnetic parking units 10, 12 of first and second embodiments of the present invention, respectively, are shown in FIGS. 1 and 2. Each magnetic parking unit 10, 12 includes a magnet 14 and a magnetic field containing member 16, 18 for containing and providing a return for the magnetic field produced by the magnet 14. An air gap (or slot) 20, 22 in the field containing member 16, 18 provides a region of high magnetic field intensity. The actuator of a disk drive is captured when a magnetically permeable portion of the actuator enters the air gap 20, 22. The disk drive is constructed so that the head(s) are parked when the actuator is captured.

Figure 3:
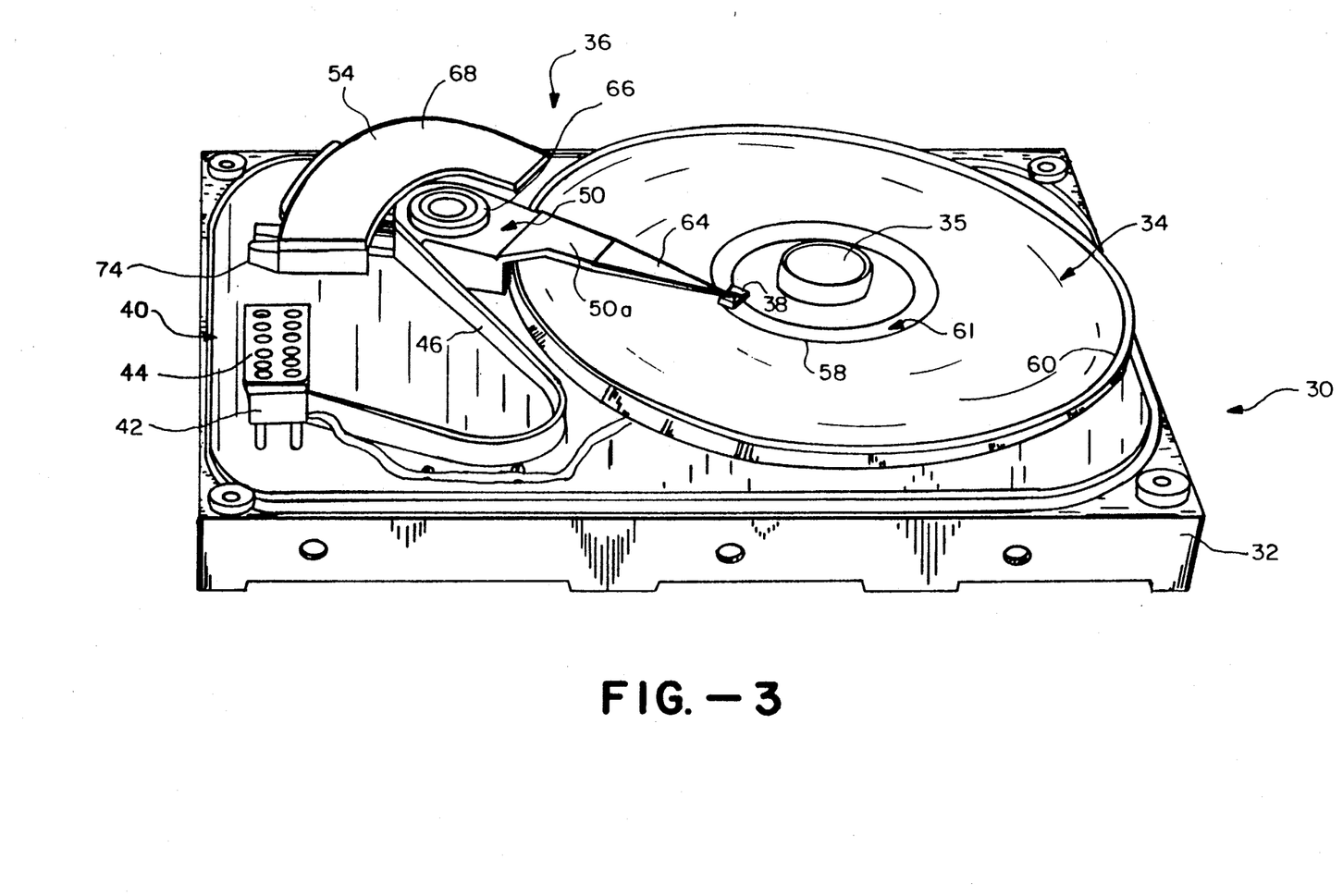
FIG. 3 is an isometric view of a disk drive including a parking device in accordance with the present invention.
Figure 4:
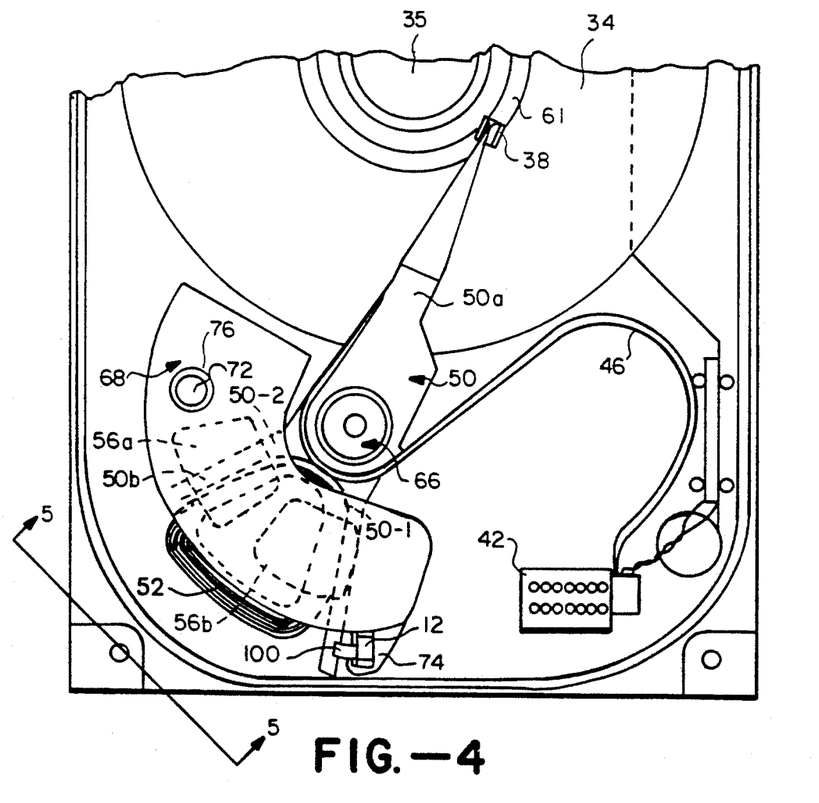
FIG. 4 is a partial plan view of the disk drive including a parking device in accordance with the present invention.

A disk drive 30 including the magnetic parking device of the present invention will be described with reference to FIGS. 3 and 4. For the purposes of describing the magnetic parking device of the present invention, disk drive 30 will be described in broad terms. Details of disk drives which may use a magnetic parking device in place of other latching devices are disclosed in above-identified, co-pending applications Ser. Nos. 147,804 and 056,584, which are hereby incorporated by reference.

Disk drive 30 has a baseplate for supporting internal components of the drive and external electronic circuitry. The internal components may be identified as three inter-related groups: disk 34 and spin motor 35, actuator assembly 36 for positioning head(s) 38 with respect to disk 34, and header assembly 40 including header 42, bracket 44, and flex circuit 46. A cover (not shown) is sealably attached to base plate 32 to provide a controlled environment between base plate 32 and the cover.

Actuator assembly 36 includes pivotable actuator arm 50, heads 38 mounted at a first end 50a of actuator arm 50, an actuator coil 52 mounted on actuator sub-arms 50-1, 50-2 at a second end 50b of actuator arm 50; the first and second actuator arm portions 50a, 50b are located on opposite sides of the pivot point of the actuator arm 50. A magnet structure 54 supports magnets 56a, b and the components of magnet structure 54, as described in detail below, are formed of magnetically permeable material to provide returns for the magnetic fields generated by magnets 56a, b. The magnet structure 54 and actuator coil 52 are arranged so that a current in coil 52, in the presence of the magnetic fields created by magnets 56, creates a force which pivots actuator arm 50. Currents passing in opposite directions in coil 52 create torques in opposite directions. The pivoting of the actuator arm 50 positions head 38 at selected locations with respect to disk 34.

Disk 34, which is rotated by spin motor 35, has specified inside and outside diameters 58 and 60 and a landing zone (or non-data area) 61 located, e.g., adjacent to the inside diameter 58. The landing zone 61 may be any selected portion of the disk 34; however, a portion of the disk 24 adjacent to the inside 58 or outside diameter 60 is usually selected.

A printed circuit assembly (or control means) 62 is attached to the bottom of base plate 12. Header 42 carries electrical signals from the printed circuit assembly 62 to the controlled internal environment.

Figure 5:
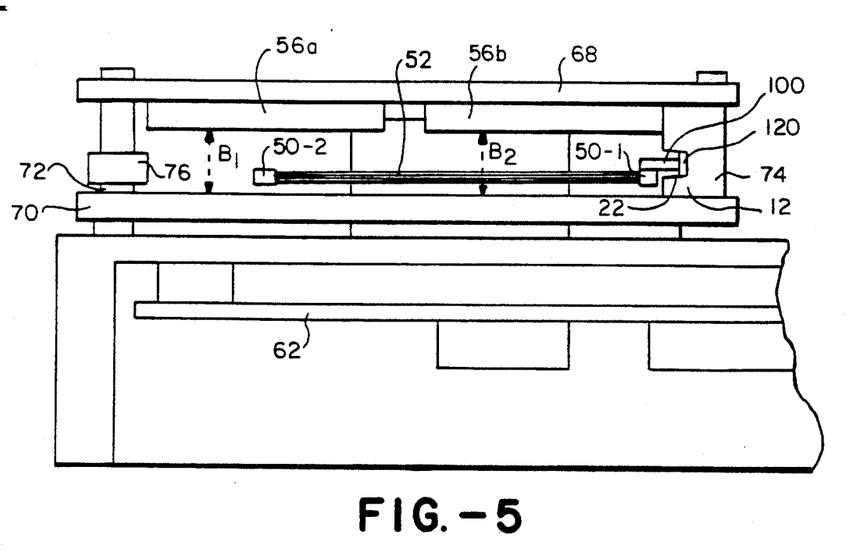
FIG. 5 is a partial, end view along line 5—5 in FIG. 4.

The structure and operation of actuator assembly 36 will be explained with reference to FIGS. 3-5. The function of the actuator assembly 36 is to selectively position heads 38 with respect to the surfaces of disk(s) 34 by pivoting actuator arm assembly 50. More specifically, to position the heads 38 over individual tracks on disk(s) 34. Heads 38 are supported on actuator arm 50 by a load beam 64 and a flexure (not shown) provided between load beam 64 and heads 38. A bearing assembly 66 is inserted in actuator arm 50 to provide a pivot point. Actuator arm 50, including all of the components attached thereto, is precisely balanced, i.e., equal amounts of weight are provided on either side of the pivot point so that the positioning of heads 38 is less susceptible to linear shock and vibration.

Magnet structure 54, which in conjunction with coil 52 comprises a voice coil assembly, includes top and bottom plates 68, 70 formed of magnetically permeable material, support posts 72, 74 also formed of magnetically permeable material, and first and second magnets 56a, b attached to the top plate 68. Top and bottom plates 68, 70 in conjunction with support posts 68, 70 function as returns for the magnetic fields provided by first and second magnets 56a, b. It is important that there are no air gaps between support posts 72, 74 and either the top or bottom plate 68, 70; any air gap would create a discontinuity in the return, greatly reducing the strength of the magnetic field.

First and second magnets 56a, b have opposite poles attached to top plate 64 (e.g., the south pole of first magnet 56a and the north pole of second magnet 56b are attached to top plate 68) to provide first and second magnetic fields $\vec{B}_1$, $\vec{B}_2$ between respective ones of the first and second magnets 56a, b and bottom plate 70. First and second magnetic fields $\vec{B}_1$, $\vec{B}_2$, are encompassed in three closed magnetic field loops including various portions of top plate 68, bottom plate 70, and first and second support posts 72, 74. By containing the magnetic fields $\vec{B}_1$ and $\vec{B}_2$, in returns, the magnetic field intensity of each field is increased in the region between the respective first and second magnets 56a, b and bottom plate 70; the strength of the magnetic field in this region is directly related to the torque which the voice coil exerts on the actuator arm 50, and thus the rotational velocity of actuator arm 50 and the seek times for the drive.

Crash stops are provided to limit the pivoting movement of actuator arm 50 so that heads 38 travel only between the inside and outside diameters 58, 60 of disk 34. Outside diameter crash stop is provided by a sleeve 76 (FIG. 5) fitted on support post 72. When the pivoting motion of actuator arm 50 places heads 38 at the outside diameter 60 of disk 34 a portion of the actuator sub-arm 50-2 contacts outside diameter crash stop 76, thereby preventing movement of the heads 38 beyond the outside diameter 60. An inside diameter crash stop is provided by the portion of the magnetic latch mechanism and is described below.

A reverse flex circuit 46 carries electrical signals from header 42 to heads 38 and actuator assembly 36. The reverse flex circuit 46 may be separated into three portions; a first portion carrying current to actuator coil 52 and a second portion which is a ground plane separating the current carrying portion from a third data carrying portion. The data carrying portion provides signals to heads 38 for recording information on disk 34 and carries signals from the heads 38 to the printed circuit assembly 62, via header 42, when reading data from disk 34. Ground plane prevents interference with the relatively weak data signals which would otherwise be caused by the larger currents necessary for actuator coil 52 passing through the first portion of the reverse flex circuit 46.

The reverse flex circuit 46 is designed to exert only a minimal amount of rotational force (torque) on the actuator arm 50. Any torque exerted on actuator arm 50 by any means other than the voice coil assembly affects the function of actuator assembly 36 in positioning heads 38 with respect to disk 34, particularly the track following and seek functions described in the above-identified co-pending applications, Ser. Nos. 057,806 and 058,289. The force provided by the voice coil assembly must be controlled to compensate for the force exerted by the reverse flex circuit 46.

A magnetic parking device for parking the heads 38, i.e., locking the actuator arm 50 in an orientation where heads 38 are positioned, for example, at the inside diameter 58 of disk 34, will be described with reference to FIGS. 1-7. During power-down of the disk drive 30, control means 62 causes actuator assembly 36 to pivot the actuator arm 50 to the position where the heads 38 are over the landing zone 61 of disk 34 before the rotational speed of the disk 34 is decreased to the point where the heads 38 land on the disk 34.

A magnetic parking device in accordance with the present invention includes a magnetic unit 10, 12 supported by or incorporated in, for example, support post 70. The elevation, i.e., vertical position, and the location, i.e., horizontal position in the x-y plane, of the magnetic unit 10, 12 is selected so that a magnetically permeable capture member 100, which may comprise a portion of actuator arm 50 or an element attached thereto, enters air gap 20, 22 in magnetic unit 10, 12 when the actuator arm 50 is rotated so that heads 38 are positioned over the landing zone 61. In the preferred embodiments of the present invention, the magnetic unit 10, 12 is positioned so that it is outside of the magnetic flux circuits of fields $\bar{B}_1$, $\bar{B}_2$ produced by magnets 56a, b. These magnetic flux circuits are contained in the top and bottom plates 68, 70, and thus the magnetic unit 10, 12 is outside of the gap between these plates 69, 70. The magnetic field in the air gap 20, 22 of magnetic unit 10, 12 captures capture member 100 to retain actuator arm 50 and to park the heads 38 without contact between capture member 100 and magnet 14.

In a first embodiment of the present invention, magnetic field retaining member 16 has an air gap 20 which is substantially perpendicular to the magnetic flux paths 112 of the magnetic field associated with magnet 14. In implementing magnetic unit 10 including a magnetic field containing member 16, the inventor of the present invention discovered that the magnetic flux lines 114 associated with air gap 20 in magnetic field containing member 16 extend outside of air gap 20 (FIG. 1B) due to a phenomenon known as fringing. The fringing results in leakage of the magnetic field. Further, the air gap 20 interrupts the magnetic circuit in field containing member 16.

Leakage of the magnetic field 114 outside of air gap 20 of field containing member 16 requires that magnetic unit 10 must be positioned so that actuator arm 50, particularly portion 100 thereof, does not enter magnetic field 114 during operation of the disk drive. As a result, the portion of disk 34 over which the head would be positioned while the actuator arm 50 is in the magnetic field 114 is not usable as a data area since the partial retention of actuator arm 50 by magnetic unit 10 would adversely affect the seek functions provided by actuator assembly 36. Specifically, the algorithms for controlling the track following and seek functions account for frictional forces and the rotational inertia of actuator arm 50 and the forces exerted by flex circuit 46; however, the intervention of an external magnetic field, which would tend to increase the rotational speed of actuator arm 50 when the head is moving toward the inside diameter 58 and decrease the rotational speed of actuator arm 50 when the head is moving away from inside diameter 58, would be difficult to implement and could be detrimental to seek times.

Figure 6A:
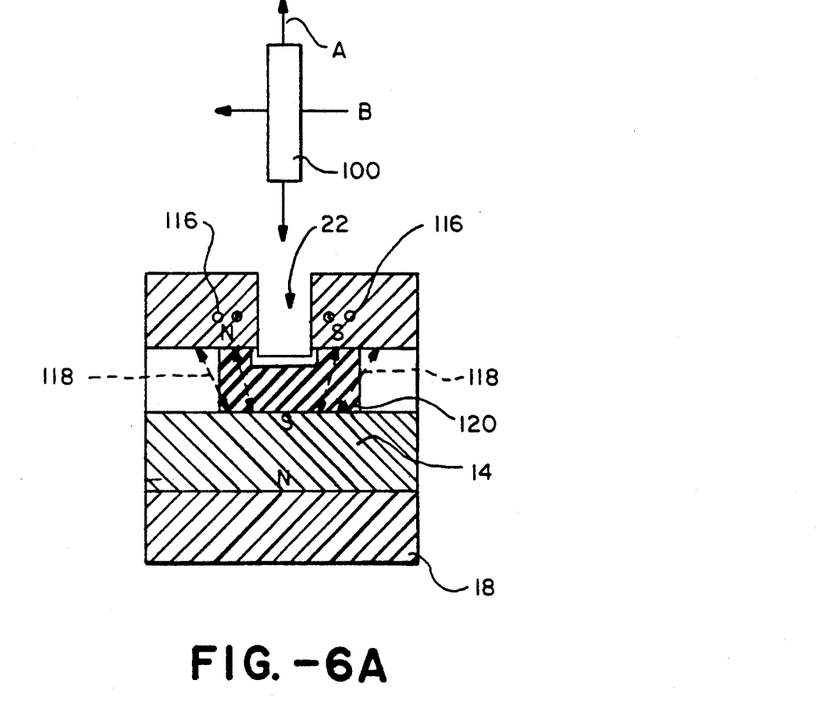
FIGS. 6A–B are sectional views along line 6—6' in FIG. 2A for describing the operation of a parking device having a magnetic unit of the second embodiment of the present invention.

It was discovered, by the inventor, that a field containing member 18 having an air gap 22 oriented in a direction substantially parallel to the magnetic flux lines 116 in field containing member 18 substantially alleviates fringing (or leakage) outside of air gap 22. As shown in FIGS. 2B and 6A, the flux lines 116 of the field in field containing member 18 are substantially parallel to air gap 22. The flux lines 118 of the field which pass from the south pole of magnet 14 to field containing member 18 all pass between magnet 14 and field containing member 18; none of the flux lines 118 extend outside of the physical boundaries of field containing member 18.

The interaction of magnetic unit 12 and capture member 100 creates a magnetic switch. With reference to FIGS. 6A, capture member 100 is non-permeated when capture member 100 is outside of air gap 22. As capture member 100 enters air gap 22 (FIG. 6B), the capture member switches to a permeated state. Capture member 100 thus becomes an integral part of the magnetic circuit—the flux paths 116 and 118—created by magnet 14, and is pulled towards the south pole S of magnet 14 and towards the north pole N of field containing member 18 at the edges of air gap 22. This structure also provides the so-called "black hole" magnetic effect. The result of the black hole magnetic effect is that actuator arm 50 is unaffected by magnetic unit 12 until capture member 100 enters air gap 22.

The pivoting motion of actuator arm 50 allows capture member 100 to move along axis A (FIG. 6A); however, the actuator bearing 66 prevents motion of capture member 100 in axis B. The magnetic forces attempting to move capture member along axis B and the magnetic force attracting capture member 100 towards magnet 14 result in a strong holding force which retains capture member 100 in air gap 22. Bumper 120 limits the travel of capture member 100 (and thus actuator arm 50) along axis A. The holding force is determined by the geometric proportions of the various elements which comprise the magnetic circuit (including field containing member 16 and capture member 100), the strength of the magnetic field in air gap 22, and the thickness of bumper 120. Bumper 120 controls the distance between magnet 14 and capture member 100 and prevents these two elements from contacting each other.

Figure 6B:
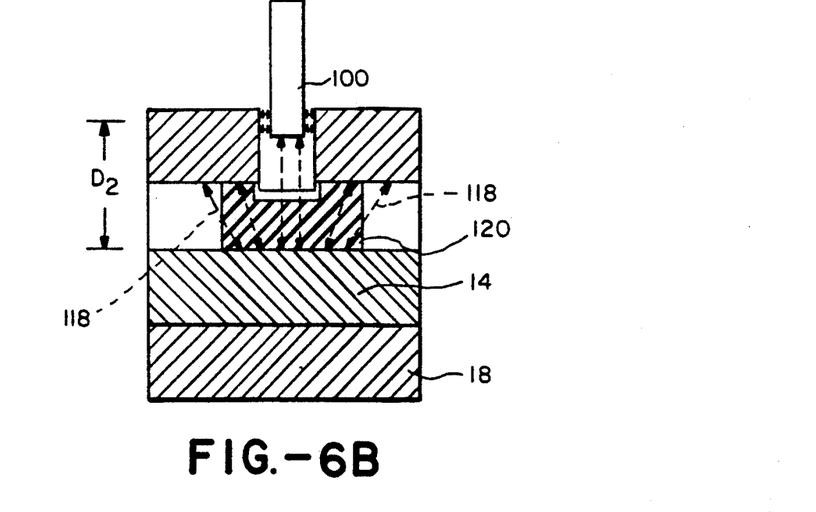
Figure 7:
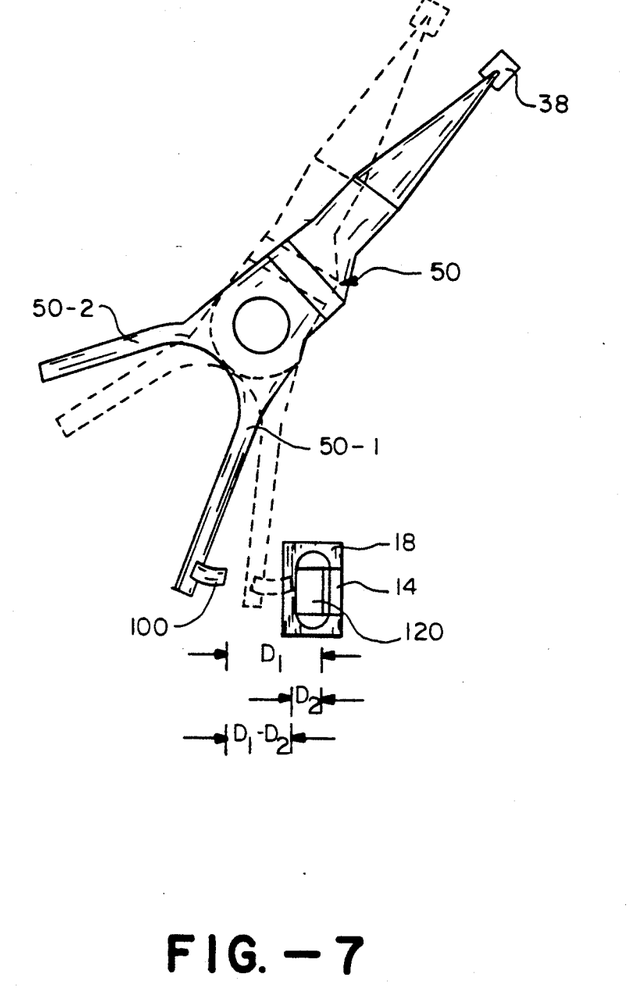
FIG. 7 is a diagram for explaining the advantages of the second embodiment of the magnetic unit.

The elimination of fringing allows more of surface of disk 34 to be utilized for data storage. As shown in FIG. 1B the portion of magnetic field 114 which passes through air gap 20 extends a distance $D_1$ from the surface of magnet 14. On the other hand, as shown in FIG. 6B, the magnetic field 118 extends only a distance $D_2$ from the surface of magnet 14 and does not leak out of the air gap 22. The difference between distances $D_1$ and $D_2$ ($D_1-D_2$) represents the difference in the point at which capture member 100 enters the magnetic fields 114 and 118 provided by magnetic units 12 and 14, respectively. This relationship is shown in FIG. 7. Further, because head 38 is positioned on actuator arm 50 at a larger distance from the pivot point of actuator arm 50 than capture member 100, the arc which head 38 travels is greater than the arc which capture member 100 travels in traversing the distance $D_1-D_2$. Accordingly, the radial measurement of the amount of disk space which is saved by using magnetic unit 12 is greater than distance $D_1-D_2$.

In both the first and second embodiments of the present invention the magnetic unit 10, 12, bumper 120 can function as an inside diameter crash stop. Bumper 120 is formed of a cushioning material, e.g., rubber or foam, which does not introduce an appreciable quantity of particles into the environment of the disk drive.

In disk drives using either the first or the second embodiment of the magnetic parking device in accordance with the present invention, the actuator arm 50 is released from the magnetic unit 10, 12 by the force generated by actuator 36. The need for a spring to bias a mechanical latch and an electromagnetic unit which continually draws current during operation of the disk drive to release a mechanical latch mechanism are eliminated.

The many features and advantages of the disk drive of the present invention will be apparent to those skilled in the art from the Description of the Preferred Embodiments. Thus, the following claims are intended to cover all modifications and equivalents falling within the scope of the invention.

What is claimed is:

1. A parking device for a disk drive having a base, a data storage medium including a data zone and a landing zone mounted on said base, a head for reading information from and writing information to the data storage medium, and an actuator for positioning the head at a number of positions with respect to the data storage medium, the actuator including a magnetically permeable portion, comprising:
    a magnet providing a magnetic field including magnetic flux having a direction; and
    a magnetic field containing member providing magnetic returns for said magnetic flux and mounted on the base, said containing member surrounding said magnet and having an air gap formed therein, said air gap comprising a slot having a length and a width, said slot being oriented with its length substantially parallel to said direction of said magnetic flux in said field containing member and adjacent said actuator so that said magnetic field captures the actuator only when the actuator is at one of the number of positions wherein the magnetically permeable portion of said actuator enters said slot in a direction substantially perpendicular to the length and width of the slot and said head is over the landing zone.

2. A parking device according to claim 1, further comprising compliant means provided on said magnet for contacting said permeable portion of the actuator when said permeable portion is captured.

3. A magnetic parking device for a disk drive having a base, a data storage medium having a data zone and a landing zone mounted on the base, a transducer for reading information from and writing information to the data storage medium; and an actuator for selectively positioning the transducer at a plurality of positions with respect to the data storage medium, comprising:
    a magnetically permeable capture member provided on the actuator; and
    magnetic parking means mounted on the base for capturing and magnetically retaining said capture member without contacting said capture member, including
        a magnet for providing a magnetic field, said magnetic field having magnetic flux having direction associated with the polarity of said magnet, and
        a magnetic field containing member surrounding said magnet and having an air gap formed therein, said magnetic flux being substantially contained within the physical boundaries of said magnetic field containing member such that said magnetic field permeates said magnetically permeable capture member only when the actuator is in one of said plurality of positions such that said permeable member enters said air gap to park the transducer over the landing zone.

4. A magnetically parking device according to claim 3, wherein said gap comprises a slot having a length and a width, and said direction of said magnetic flux in said field containing member is oriented substantially parallel to said length of said air gap in said field containing member and said permeable member enter said gap in a direction substantially perpendicular to the length and width.

5. A magnetic parking device according to claim 4, further comprising bumper means provided on said magnet for engaging said magnetically permeable capture member to act as a crash stop for the actuator.

6. A low-power disk drive responsive to a host computer, comprising:
    a base plate;
    a rotatable disk supported on said base plate, said disk having a landing zone;
    control means for generating control signals;
    means, responsive to control signals, for interacting with said disk, comprising,
        head means for reading and recording information,
        an actuator arm pivotably supported on said base plate for supporting said head means, and
        voice coil means for pivoting said actuator arm to selectively position said head means at a plurality of positions with respect to said disk;
    a permeable capture member provided on said actuator arm; and
    parking means for parking said head means, including,
        magnet means for creating a magnetic field having magnetic flux, and
        a magnetic field containing member providing returns for said magnetic flux having an air gap formed therein, said air gap having a length and a width wherein said length is greater than said width and said length is substantially parallel to the direction of said magnetic flux in said field containing member, so that the magnetic field captures said capture member only when said capture member enters said air gap in a direction substantially perpendicular to the length and width of the gap and said head means is at one of said plurality of positions over said landing zone.

7. A low-power disk drive according to claim 6, wherein said voice coil means generates sufficient force to pivot said actuator means to release said capture member from said parking means in response to control signals.

* * * * *